US010875661B2

United States Patent
Linde et al.

(10) Patent No.: US 10,875,661 B2
(45) Date of Patent: Dec. 29, 2020

(54) FIBER COMPOSITE COMPONENT HAVING AN INTEGRATED STRUCTURAL HEALTH SENSOR ARRANGEMENT

(71) Applicant: Airbus Operations GmbH, Hamburg (DE)

(72) Inventors: Peter Linde, Hamburg (DE); Leif Asp, Moelndal (SE); Dan Zenkert, Lidingoe (SE); Göran Lindbergh, Lidingö (SE)

(73) Assignee: Airbus Operations GmbH

( * ) Notice: Subject to any disclaimer, the term of this patent is extended or adjusted under 35 U.S.C. 154(b) by 0 days.

(21) Appl. No.: 16/709,034

(22) Filed: Dec. 10, 2019

(65) Prior Publication Data

US 2020/0198800 A1   Jun. 25, 2020

(30) Foreign Application Priority Data

Dec. 20, 2018  (DE) .................. 10 2018 133 015

(51) Int. Cl.
| | |
|---|---|
| G01C 23/00 | (2006.01) |
| B64D 45/00 | (2006.01) |
| B32B 7/025 | (2019.01) |
| B32B 5/12 | (2006.01) |
| G01L 1/22 | (2006.01) |
| G01M 5/00 | (2006.01) |

(52) U.S. Cl.
CPC ............ *B64D 45/00* (2013.01); *B32B 5/12* (2013.01); *B32B 7/025* (2019.01); *G01L 1/2287* (2013.01); *G01M 5/0016* (2013.01); *G01M 5/0083* (2013.01); *B32B 2605/18* (2013.01); *B64D 2045/0085* (2013.01)

(58) Field of Classification Search
CPC ........... B64D 45/00; B64D 2045/0085; G01M 5/0083; G01M 5/0016; G01M 5/0041; B32B 7/025; B32B 5/12; B32B 17/12; B32B 2605/18; G01L 1/2287
See application file for complete search history.

(56) References Cited

U.S. PATENT DOCUMENTS

| | | | |
|---|---|---|---|
| 8,451,013 B1 | 5/2013 | Hsiao | |
| 9,242,427 B2* | 1/2016 | Kozar | .............. B29C 70/202 |
| 2005/0284232 A1 | 12/2005 | Rice | |
| 2011/0089958 A1* | 4/2011 | Malecki | ............. G01N 27/20 |
| | | | 324/693 |

FOREIGN PATENT DOCUMENTS

| | | |
|---|---|---|
| DE | 102008058882 A1 | 6/2010 |
| DE | 102017221041 A1 | 5/2019 |
| EP | 0989215 B1 | 9/2009 |
| EP | 2950085 A1 | 12/2015 |
| GB | 2180940 A | 4/1987 |
| GB | 2421952 A | 7/2006 |

\* cited by examiner

*Primary Examiner* — Toan N Pham
(74) *Attorney, Agent, or Firm* — Lerner, David, Littenberg, Krumholz & Mentlik, LLP

(57) ABSTRACT

A fiber composite component includes an integrated structural health sensor arrangement, wherein the component includes a plurality of layers of fibers embedded in a matrix material, wherein the layers include at least two strain sensing fibers arranged parallel and at a distance to each other, wherein the strain sensing fibers are lithiated carbon fibers having piezoelectric characteristics.

14 Claims, 4 Drawing Sheets

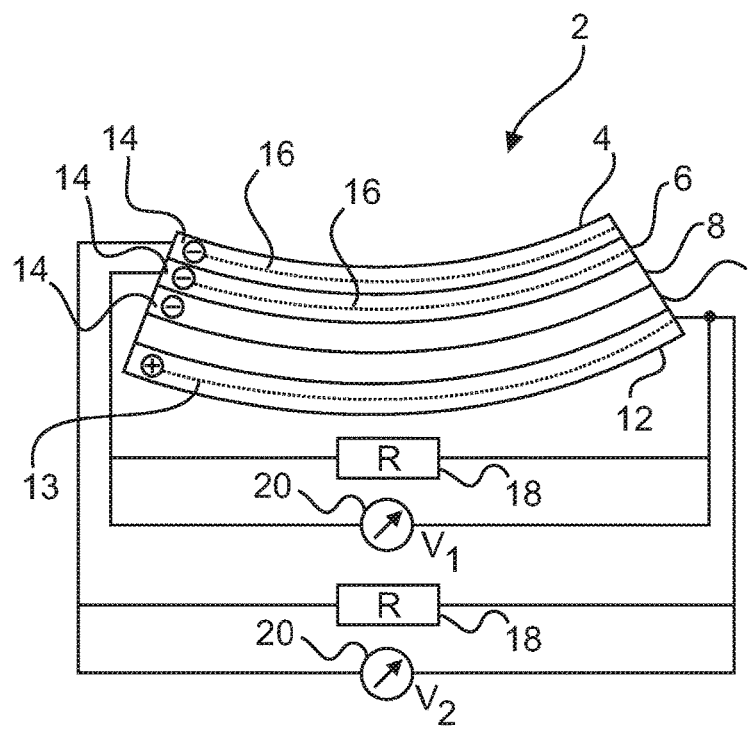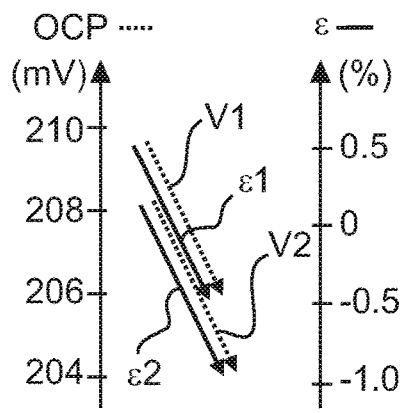
Fig.1a  Fig.1b
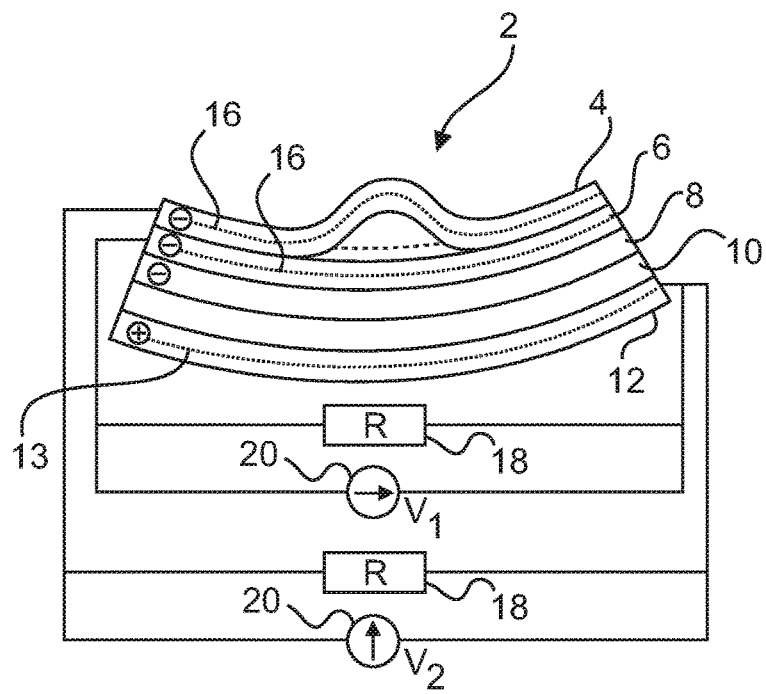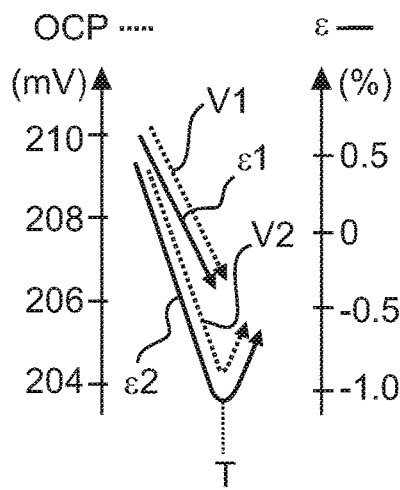
Fig. 2a  Fig. 2b

FIBER COMPOSITE COMPONENT HAVING AN INTEGRATED STRUCTURAL HEALTH SENSOR ARRANGEMENT

FIELD OF THE INVENTION

The invention relates to a fiber composite component having an integrated structural health sensor arrangement.

BACKGROUND OF THE INVENTION

Structural health monitoring in aircraft components is well known. In some cases, aircraft components based on a metallic material are be equipped with strain gauges attached to a plurality of positions and connected to an electronic evaluation unit. Due to the characteristic properties of metallic materials, this covers the most interesting events to be detected.

With composite components that usually consist of layers of fibers embedded in a matrix material, additional events of interest may occur, such as delaminations. For detecting delaminations it is a known approach to include an ultrasonic sound transmitter directly into the respective component as well as several sensors at different positions that are susceptible for ultrasonic sound waves. The sensors deliver a signal based on the detected sound waves to an evaluation unit. A suitable evaluation algorithm is able to analyze these signals, from which a delamination as well as rough positions of the delamination can be calculated. Hence, the component of interest needs to be heavily modified in order to provide a sufficient health monitoring. Also, precise results are only possible if a sufficient number of sensors are used that are placed at all required positions. Depending on the complexity of the component this requires a lot of effort.

BRIEF SUMMARY OF THE INVENTION

It may thus be beneficial to clearly reduce the effort for providing a sufficiently accurate structural health monitoring in a composite component. Consequently, aspects of the invention may provide a composite component that is equipped or is equipable with a structural health monitoring device that allows a sufficiently accurate health monitoring with a clearly reduced effort for integration of sensors into or onto the component as well as a clearly reduced impact on the design of the component itself.

It is proposed a fiber composite component having an integrated structural health sensor arrangement, the component comprising a plurality of layers of fibers embedded in a matrix material, wherein the layers comprise at least two strain sensing fibers arranged parallel and at a distance to each other, wherein the strain sensing fibers are lithiated carbon fibers, wherein the component comprises an electrical connecting device accessible from an outer delimiting surface or an outer edge of the component, and wherein the electrical connecting device is connected to the strain sensing fibers.

Thus, the composite component may comprise a usual design with several layers of reinforcement fibers embedded in a matrix material. It is clear that the composite component may comprise a plurality of layers, each having fibers arranged along at least one certain direction. Preferably, the component according to the invention comprises several layers of fibers arranged in several discrete directions.

For providing a structural health monitoring, some of the fibers of the component slightly differ from the reinforcement fibers and act as strain sensing fibers. This is advantageous, since the general design of the component is hardly affected, and the mechanical properties do not differ from those of a common composite component. The strain sensing fibers simply allow to provide the additional function of the strain sensor, while they still provide the desired reinforcement.

The strain sensing fibers may be arranged in or on one or a plurality of the layers. It may be preferred to arrange strain sensing fibers inside the component on the inside of the outermost layers. Thus, a plurality of strain sensing fibers may be arranged on an inner side of a first layer of the component in the form of lines or a grid. Further, a plurality of strain sensing fibers may be arranged on an inner side of a last layer of the component in the form of lines or a grid. Inner side is to be interpreted as a side of the respective layer, that faces into the layer structure of the component.

The strain sensing fibers and the electrical connection device do not necessarily mesh with the remaining fibers. It may also be feasible to attach the strain sensing fibers onto a layer of the composite component, such as a prepreg layer or a fiber layer, and to cure the compound together. Thus, the component layers of interest may all comprise an arrangement of strain sensing fibers on top, wherein all layers may be infused and/or cured together.

The term "lithiated" is to be understood as enriched or covered by Lithium. A carbon fiber may be lithiated through electrodeposition of Lithium ions, for example by immersing the fiber into a non-aqueous electrolyte, connecting a positive pole of a direct current source with the fiber to form an anode and a negative pole to a Lithium containing electrode to form a cathode. Lithium ions will then move from the Lithium source and attach to the anode. Consequently, the strain sensing fibers may be lithiated prior to their installation in the respective component. As mentioned further below, they may also be lithiated after their installation.

It has been discovered that lithiated carbon fibers comprise piezoelectric properties. Consequently, if a lithiated fiber is subjected to a mechanical load due to flexural deformation of the composite, it will generate a certain electrical load, which can be measured against a reference potential. Thus, the lithiated carbon fibers constitute the structural health sensors, which are integrated into the fiber composite component. As a lithiated carbon fiber is based on a common carbon fiber, it may still provide the reinforcement and is able to be integrated together with other reinforcement fibers into the respective component.

Since it is proposed to use a plurality of lithiated fibers in a layer of the component, the mechanical load onto several fibers can be detected simultaneously and thus, by comparing the individually detected loads or with suitable reference values, it may easily be detected if a fiber in a certain layer of the component provides clearly different measurement results than the strain sensing fibers of the other layers, which may then be interpreted as a delamination. In such a case the measurable mechanical load or the course of the received measurement signals of the affected fiber distinctly differs from the results derived from the other fibers in an area of the component that does not extend through a delamination.

The electrical connecting device allows to contact all fibers to an evaluation unit, which may preferably be an external evaluation unit. For this, the electrical connection device comprises several inputs, which are connected to the individual fibers as well as several outputs that are accessible from an outer side of the component.

In an advantageous embodiment, the at least two strain sensing fibers comprise at least two strain sensing fiber strands, each comprising a plurality of strain sensing fibers extending along the same direction. Thus, a plurality of lithiated strain sensing fibers are provided for each section of the respective component, which allows to improve the measurement of a piezo voltage. The strand may exemplarily be provided in the form of a tape.

Regarding the piezoelectric effect it is required to provide a reference layer against which the potential of the respective lithiated fibers can be measured. Thus, an exemplary embodiment further comprises at least one reference layer that is capable of being lithiated, and at least one electrically insulating layer, which is permeable for Lithium ions and is arranged between the at least one reference layer and all strain sensing fibers. The combination of a reference layer and strain sensing fibers arranged on a layer of the component on the inner side as well as the electrically insulating layer resembles a battery-like structure. If a plurality of layers of the component is equipped with strain sensing fibers, a plurality of battery structures may be formed in the component. If only the outermost layers of the component are equipped with the strain sensing fibers, as mentioned above, they may share a common reference layer that is arranged between both layers. Thus, a battery-like structure serves as a strain sensor.

A voltage representing the strain, to which the strain sensing fibers are subjected, can be measured between individual strain sensing fibers and the at least one reference layer. The at least one reference layer may be a single fiber or a strand of fibers in the composite component. As an alternative thereto, it may also be a part of a lightning protection layer integrated into the component. Still further, a metallic element or an element made from a carbon allotrope may be separately provided for allowing the measurement of the voltage of interest.

As mentioned above, the strain sensing fibers may be lithiated before their installation into the component. However, given the battery-like structure, they may be lithiated by application of a charging voltage onto the reference layer and the respective strain sensing fibers. Due to the permeability of the electrically insulating layer for Lithium ions, the strain sensing fibers are lithiated by transferring Lithium ions from the reference layer to the strain sensing fibers. Thus, the reference layer acts as a cathode, while the strain sensing fibers act as an anode. It is to be understood that at least one of the reference layer and the strain sensing fibers need to contain a sufficient amount of Lithium prior to installation.

It may be possible to use lithiated carbon fibers in the reference layer that are integrated into the component. This may be preferred if the component is made from a carbon fiber reinforced material.

In an exemplary embodiment, the at least two strain sensing fibers extend over at least a half and preferably over at least three quarters of a surface extension of the component. Fiber composite components may extend over substantial geometrical dimensions. For example, fuselage shells of modern commercial aircraft may extend over measures that clearly exceed 10 m at least in one direction. A delamination in a composite component may begin as a rather local issue and may slowly extend over larger distances. Thus, an extensive or tight-meshed monitoring of the component is helpful for detecting an issue as early as possible. Thus, it is reasonable to let the fibers extend over a substantial part of the surface extension of the component.

In an example, the component comprises several layers of fibers arranged on top of each other, wherein at least two of the layers each comprise at least one strain sensing fiber, wherein at least one group of strain sensing fibers is created with all strain sensing fibers of the at least one group extending in the same direction. By integrating the load sensing fibers into multiple layers of the composite material it is possible to detect delaminations in all of these layers or in a directly adjacent layer. It is beneficial to allow a comparability between the measurements of at least two strain sensing fibers that roughly extend in the same direction and that belong to different layers. Since the integration of the load sensing fibers is rather simple, compared to known methods for integrating ultrasound sensors or other devices, it is worthwhile to include strain sensing fibers in every third, every second or even every layer. Of course, this may depend on the criticality of the respective component.

Hence, the component comprises several layers of fibers arranged on top of each other, wherein at least two strain sensing fibers are arranged in different layers and extend along the same direction.

In a further advantageous embodiment, the component comprises several layers of fibers arranged on top of each other, wherein two groups of strain sensing fibers are arranged in at least one of the layers, wherein the strain sensing fibers of each group extend along the same direction, and wherein the strain sensing fibers of a first group and of a second group enclose an angle of at least 45° and preferably of 90°. The combination of a first group and a second group of strain sensing fibers leads to the creation of a sensor grid over the component, which allows to detect delaminations even more reliably. It is reasonable to arrange the strain sensors of the two groups of fibers perpendicularly to each other, i.e. at an angle of 90°. However, if the component comprises a shape that more resembles a triangle or a parallelogram it may be reasonable to adapt the orientation of the load sensing fibers of one of the groups to an outer edge of the component, such that the angle between the fibers of the two groups is less than 90°.

For even further improving the structural health monitoring, at least two layers each comprise at least one group of strain sensing fibers. Thus, a densely-meshed monitoring over the individual layers and a comparison of many different strain sensing sensors between the individual layers is possible.

For receiving the signals of the strain sensing fibers of the second group by an evaluation unit, it is feasible to contact the fibers of both groups to a single electrical connection device. This may reduce the effort in providing the required connections. However, for increasing the reliability of the health monitoring, it may also be possible to use a separate, i.e. a second, electrical connection device for the second group of strain sensing fibers. The second electrical connection device may be arranged at a clear distance to the first electrical collection device, such that a damage that extends through connecting lines may affect only one of the electrical connection devices. Still further, all strain sensing fibers may be connected to all electrical connection devices.

The component may further comprise two independent electrical connection devices arranged at diametrically opposed ends of the component. They may be connected to all strain sensing fibers or only two different groups of strain sensing fibers. In both cases, the reliability of retrieving sensor signals is increased in comparison to a single electrical connection device.

It may be preferred if the strain sensing fibers comprise an electrically insulating coating. Hence, if the strain sensing fibers are installed in a component with other electrically conducting elements in their surroundings, this reduces the risk of erroneous signals.

It is advantageous if the component is a carbon fiber reinforced component. Hence, there is no change in the mechanical properties and even the strain sensing fibers contribute to the mechanical stability of the component.

The invention further relates to a component system with integrated structural health monitoring, the system comprising at least one fiber composite component according to the above description, and at least one evaluation unit connected to the electrical connection device of the at least one fiber composite component, wherein the evaluation unit is designed to receive measurement parameters from a plurality of strain sensing fibers and to compare the parameters of at least two of the strain sensing fibers arranged in the same component, extending in the same direction and provided in different layers and to generate a warning signal if a difference of the parameters is outside a predetermined tolerance. Thus, the evaluation unit is able to detect a delamination by comparing the parameters delivered by two strain sensing fibers. These parameters may simply be a measured voltage between the strain sensing fibers and the at least one reference layer. Preferably, a pairwise comparison is conducted by the evaluation unit, such that always a pair of measured parameters is compared. However, also the measured parameters associated with more than two layers may be compared to each other, thereby ruling out potential errors in measurements deriving from a broken connection of a strain sensing fiber or such. The warning signal may be transferred to a display unit, a data storage unit or any other means that allow to signalize an unwanted condition of a respective component in real time or during a subsequent analysis of health monitoring data.

Still further, the evaluation unit may be designed to locate a potential delamination by pairwisely comparing the measured parameters of all individual strain sensing fibers of one layer with the respectively positioned individual strain sensing fibers of another layer. This may also be conducted for the grid arrangement with a first group of strain sensing fibers with a first direction of extension and a second group of fibers with a second direction of extension in that both groups are subjected to a pairwise comparison.

The evaluation unit may be designed for conduction the comparison in certain time intervals.

Due to continuous travel of Lithium ions from the strain sensing fibers to the reference layer it may be feasible to re-lithiate the strain sensing fibers from time to time by application of a charging voltage to the reference layer and the respective strain sensing fibers. This may be conducted by the evaluation unit or another separate unit that is capable of providing this function. During such a process, which can be considered a charging process, the monitoring function may be paused.

The invention further relates to an aircraft comprising at least one such fiber composite component system.

Finally, the invention relates to the use of lithiated carbon fibers integrated into a layer structure of a composite component as strain sensors in the component.

If desired, the strain sensing fibers and the reference layer may extend over a substantial fraction of the component according to the invention. Thus, this arrangement may even be used as a battery, wherein the voltage delivered by the individual layers of strain sensing fibers change due to the flexural stress they are exposed to.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

FIGS. 1a and 2a show a fiber composite component in a schematic sectional view without delamination (FIG. 1a) and with delamination (FIG. 1c).

FIGS. 1b and 2b show a strain/time diagram associated with the components of FIGS. 1a and 2a.

DETAILED DESCRIPTION

Figure 3:
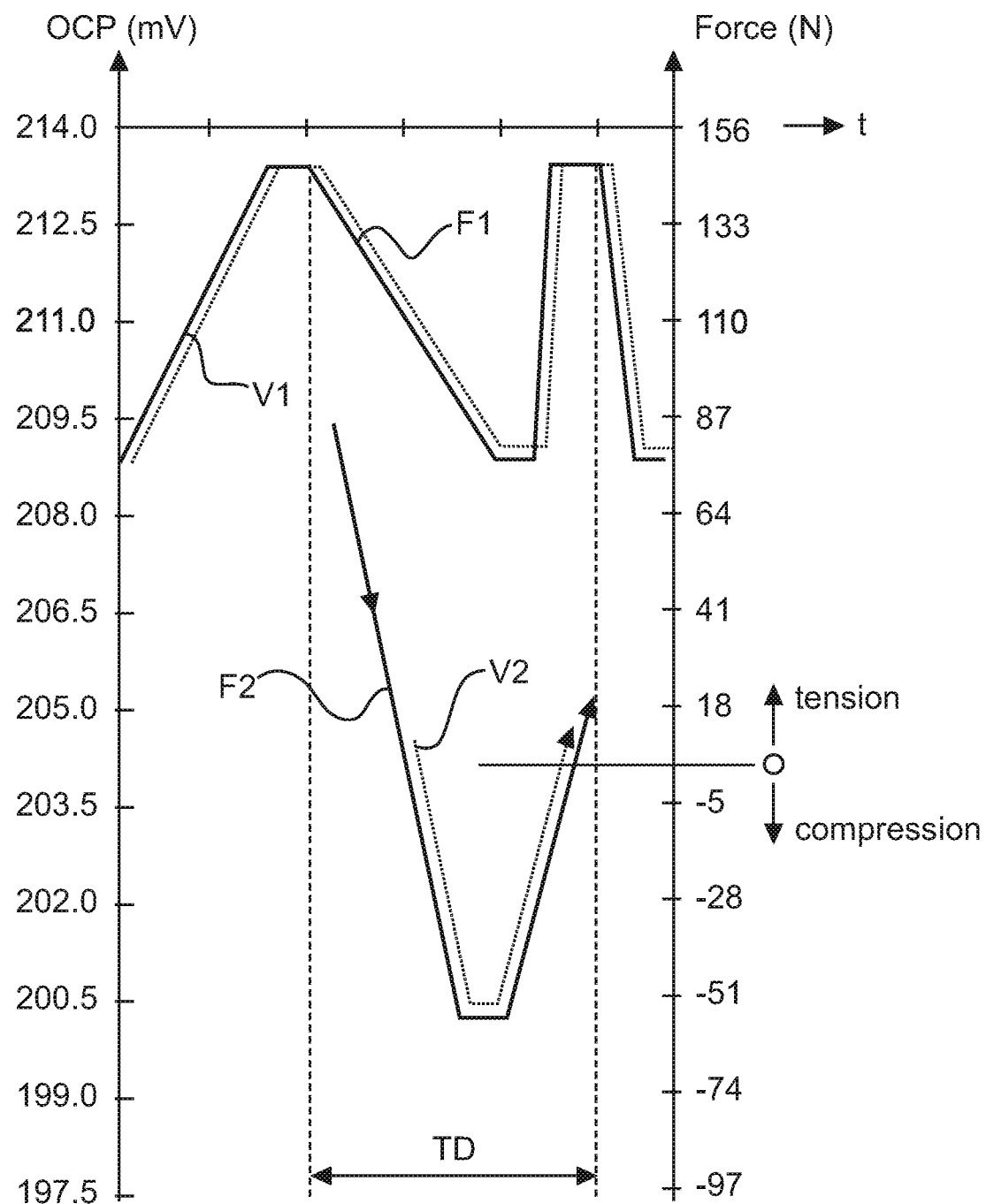
FIG. 3 shows a strain/time diagram with a progressing delamination.

FIG. 1a shows a fiber composite component 2 in a very schematic view. The component 2 comprises several layers, i.e. a first layer 4, a second layer 6, a third layer 8, a fourth layer 10 and a fifth layer 12, which may all comprise reinforcement fibers embedded into a matrix material 14. The component may be a carbon fiber reinforced component having carbon fibers in each of the layers 4, 6, 8, 10 and 12. However, it is possible that the fourth layer 10 comprises a slightly different setup to act as an electrically insulating layer, which may contain non-conducting fibers. Since this is a schematic illustration, it is possible to include more or less layers, depending on the actual purpose.

Exemplarily, the first, second and third layers 4, 6 and 8 each comprise at least one dedicated strain sensing fiber 16, which is realized in the form of lithiated carbon fiber. They are an integral part of the respective layer 4, 6 and 8 and are thus embedded into the matrix material 14. For preventing an electrical contact with neighboring fibers, they are electrically insulated. This is particularly useful in a carbon fiber composite component.

As FIG. 1a is mainly directed to the concept of strain sensing in general, the strain sensing fibers 16 of the first layer 4 and the second layer 6 in the illustration are schematically connected to one end of a resistor 18 each, whose other end is connected to a conducting element of the fifth layer 12. The strain sensing fibers 16 are lithiated carbon fibers. In turn, the fifth layer 12 comprises a reference layer 13 in the form of carbon fibers that are capable of being lithiated. Thus, the reference layer exemplarily constitutes a cathode, while the strain sensing fibers 16 act as anodes. The arrangement of the reference layer 13 and the strain sensing fibers 16 as well as an electrically insulating layer 10 inbetween, resembles a battery-like structure. If the strain sensing fibers 16 are sufficiently lithiated, a voltage can be measured between the strain sensing fibers 16 and the reference layer 13.

Each resistor is connected to a gauge 20 in a parallel connection for illustration purposes. The arrangement of a resistor 18 and gauge 20 resembles a measurement device with suitable electrical properties for the intended purpose. It has been found that lithiated carbon fibers in the arrangement as shown has piezoelectrical properties. On exerting a flexural stress onto the component 2 a certain change in voltage between the strain sensing fibers 16 and the reference layer 13 can be recognized. The setup of FIG. 1a therefore leads to an indication of a strain measured by the strain sensing fibers 16, which depends on the flexural stress. It can be seen that both gauges show the same voltage, which means that the strain sensing fibers 16 in both layers 4 and 6 are substantially subjected to the same load and thus a delamination can be excluded.

In FIG. 1b an open circuit potential/voltage V1 and V2 of the strain sensing fibers 16 over time of the first layer 4, which is associated with V1, and the second layer 6, which is associated with V2, are shown as straight dashed curves. Further, the associated elongations ε1 and ε2 of the strain sensing fibers 16 of the first layer 4, which is associated with ε1, and the second layer 6, which is associated with ε2, are shown as curves. In this example, the voltage curves and the elongation curves are proportional and completely straight. This may belong to a continuous change in flexural stress to the component 2, which leads to a continuous change in both the measured voltage over the strain sensing fibers 16 and the elongations.

An important point in this illustration is the fact that the elongation characteristics of both layers 4 and 6 are the same. Both the curves V1 and V2 as well as ε1 and ε2 follow each other. If this behavior can be detected, it can be estimated that the component 2 does not have any delamination in an area that is monitored by a strain sensing fiber 16.

However, if a delamination occurs in the component 2, this behavior changes and the curves V1 and V2 as well as ε1 and ε2 differ in a manner that allows a detection of the delamination. This is exemplarily shown in FIGS. 2a and 2b. As can be seen in FIG. 2a, the component 2 is under a flexural stress, which has led to the first layer 4 being delaminated from the layer 6 below. As a consequence, the first layer 4 exemplarily buckles out. Thus, the delaminated layer 4 has undergone a change in length upon delamination, compared with its length before delamination. The change in length results from a lack of bonding under compression along the delaminated length. If this layer contains at least one lithiated carbon fiber, the delamination, which is equivalent to a change in strain, leads to a corresponding change in a measured potential. This is shown in FIG. 2b.

The voltage to be measured between the strain sensing fibers 16 in the first layer 4 and the reference layer 13 over time changes differently than in the second layer 6. Here, at a certain time T the course of the curves V2 and ε2 changes its direction, while the curves V1 and ε1 follow their straight course as in FIG. 1b. Hence, from the time instants after T, the behavior of V1 and V2 as well as ε1 and ε2 clearly differ. If such a characteristic can be found, a delamination can be detected. By measuring the change in voltage associated with certain strain sensing fibers 16, which differs from the change in voltage of the neighboring strain sensing fibers 16, implies a change in length which in turn implies a delamination.

A further aspect of using strain sensing fibers 16 comprising lithiated carbon fibers lies in that strain changes can be measured gradually. This allows to detect a delamination almost directly and allows to monitor its propagation through the composite component 2, as exemplarily shown in FIG. 3. Here, a certain V2 curve, which is followed by F2 as a force acting on the respective strain sensing fiber 16, rapidly decreases over time differently than a corresponding branch of V1 and F1 during a time period TD. The force on the strain sensing fiber in the delaminated layer assumes a value around zero at the end of the curve F2.

Figure 4:
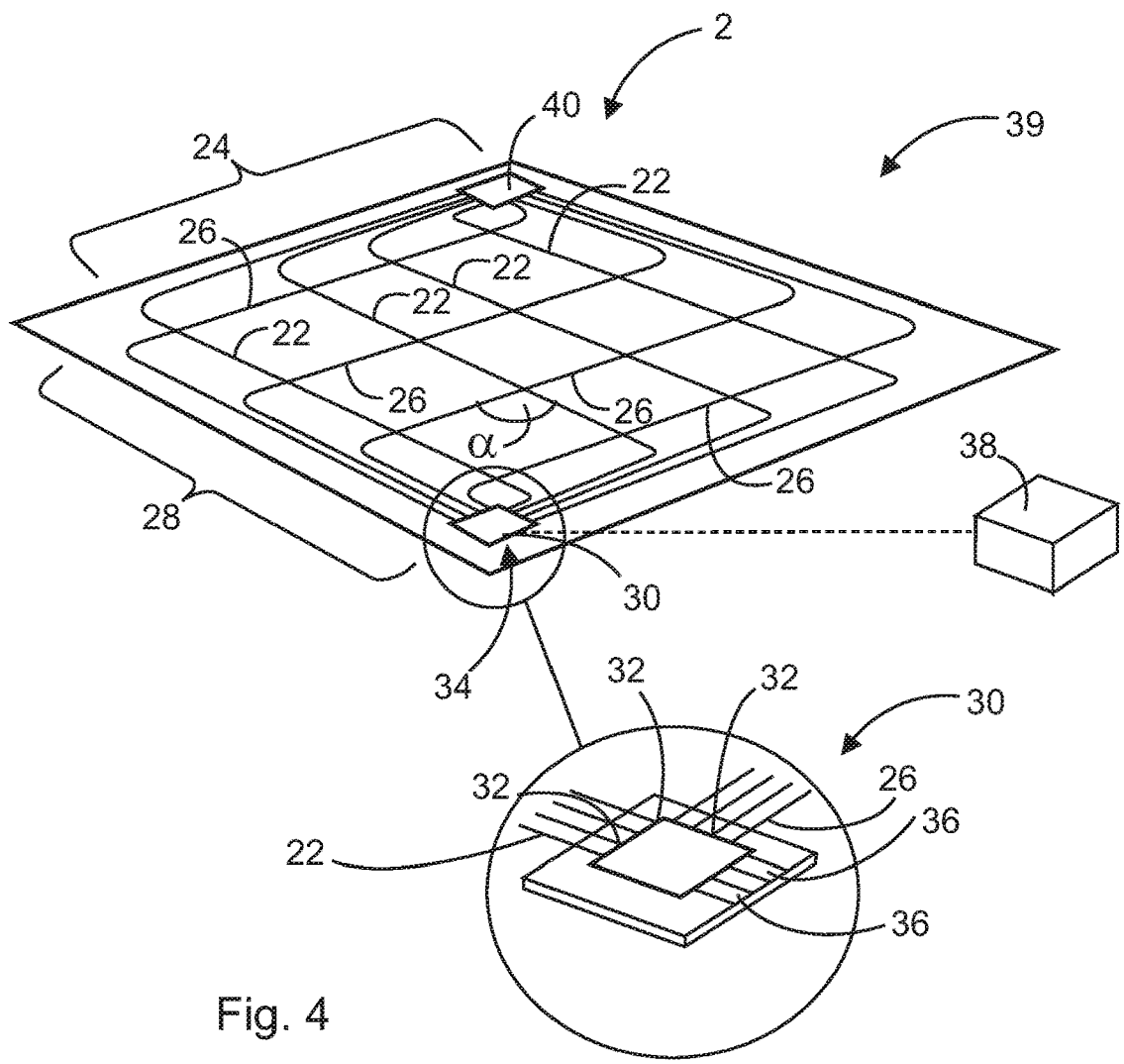
FIG. 4 shows the component in a spatial view having strain sensing fibers arranged in a grid.

In FIG. 4 a component system 39 is shown, with the component 2 illustrated in a spatial view. Here, several strain sensing fibers are shown in different orientations and alignments. While FIG. 4 explicitly only shows a single layer, it is clear that the component 2 may comprise a plurality of layers, wherein two or more layers may be equipped like the one shown in FIG. 4.

Exemplarily, first strain sensing fibers 22 are arranged in the component 2 parallel and at a distance to each other. All first strain sensing fibers 22 constitute a first group 24. Second strain sensing fibers 26 are extend along another direction, are arranged at a distance to each other and, similarly to the first strain sensing fibers 22, are arranged parallel to each other. Thus, they constitute a second group 28 of strain sensing fibers. The first strain sensing fibers 22 and the second strain sensing fibers 26 enclose an angle α, which in this example is 90°.

A first electrical collection device 30 is embedded into the component to and comprises a plurality of inputs 32 coupled with the strain sensing fibers 22 and 26. At an outer edge 34 of the component 2 a number of outputs 36 are arranged, which allow to retrieve the signals delivered by the strain sensing fibers 22 and 26. Thus, a simple plug with a cable or a wireless transmitter can be connected to the outputs 36 for delivering the signals to an evaluation unit 38. For increasing the reliability of the connection between the strain sensing fibers 22 and 26 and the evaluation unit 38, a second electrical connection device 40 may be used.

As a side note, the arrangement of strain sensing fibers 22 and 26 in FIG. 4 may be placed on a carrier foil to be attached to an uncured or precured composite component, such that the strain sensing fibers 22 and 26 and the connection devices 30 and 40 are directly integrated into the component 2.

Figure 5:
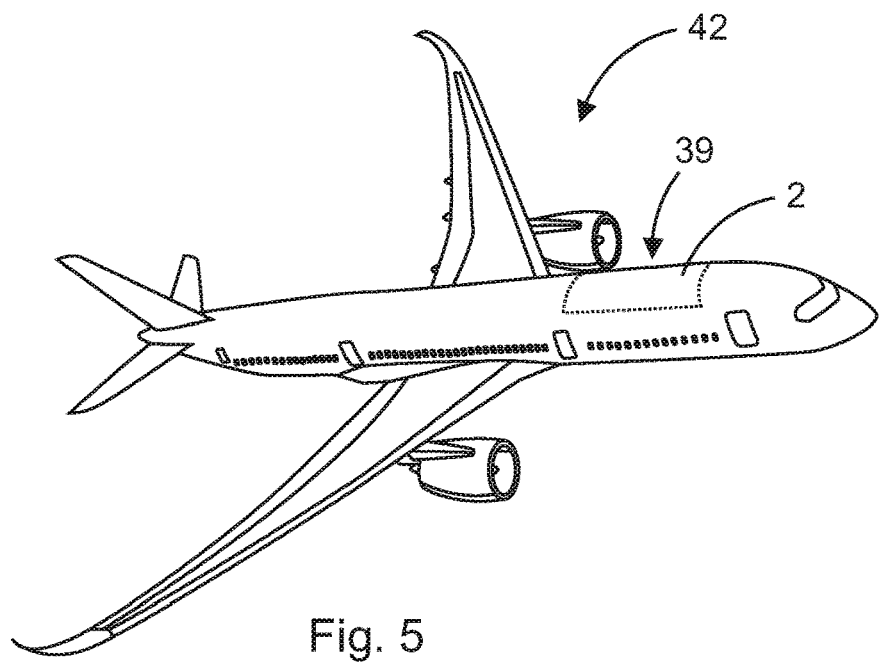
FIG. 5 shows an aircraft having at least one such component.

FIG. 5 shows an aircraft 42 having a component system 39 with at least one such component 2. As an example, the component 2 is a part of a fuselage. However, every other part, made of a composite, can be equipped with the strain sensing fibers according to the invention.

Figure 6:
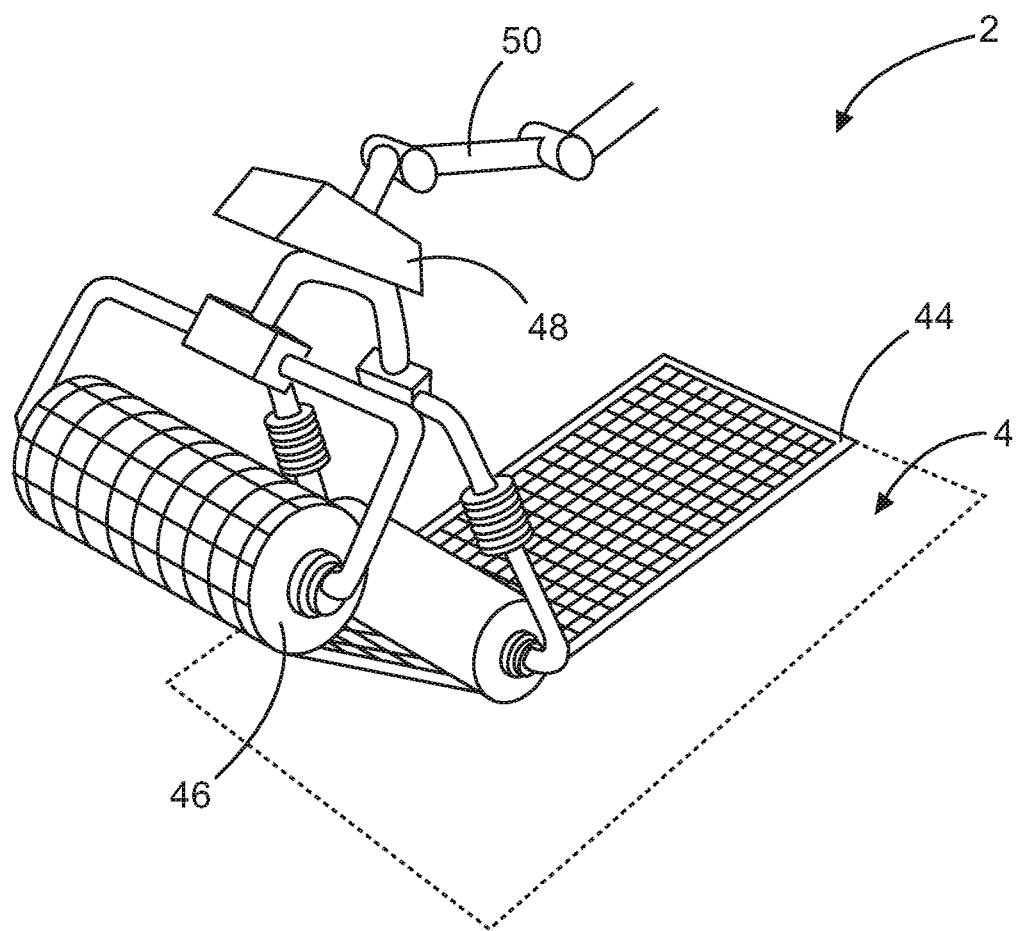
FIG. 6 shows a possible process for integrating the strain sensing fibers.

Finally, FIG. 6 shows an exemplary process of integrating the strain sensing fibers and the carbon fibers of the reference layer into a component 2 during its manufacturing. Here, exemplarily the first layer 4 is shown, onto which a grid as depicted in FIG. 4 is attached. For this, the strain sensing fibers 22 and 26 are arranged on a transfer foil 44, which is stored on a rotatably supported spool 46. This allows to use a tape placement head 48 arranged on a robotic arm 50 or any other suitable device for transferring the foil 44 onto the respective layer 4. After attaching the transfer foil 44 with the strain sensing fibers 22 and 26, the transfer foil 44 may be removed from the respective layer 4 and the strain sensing fibers 22 and 26. Afterwards, the additional second, third and all subsequent layers 6 to 12 can be arranged and the compound of all layers and strain sensing fibers can be cured.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 fiber composite component
4 first layer
6 second layer
8 third layer
10 fourth layer
12 fifth layer
13 reference layer/cathode
14 matrix material
16 strain sensing fibers/anode
18 resistor
20 gauge
22 first strain sensing fibers
24 first group
26 second strain sensing fibers
28 second group
30 first electrical connection device
32 input
34 outer edge
36 output
38 evaluation unit
39 component system
40 second electrical connection device
42 aircraft
44 transfer foil
46 spool
48 tape placement head
50 robotic arm
V1, V2 open circuit potential/voltage
ε1, ε2 elongation
F1, F2 force
α angle

The invention claimed is:

1. A fiber composite component having an integrated structural health sensor arrangement,
the component comprising a plurality of layers of fibers embedded in a matrix material,
wherein the plurality of layers comprises at least two strain sensing fibers arranged parallel and at a distance to each other,
wherein the at least two strain sensing fibers are lithiated carbon fibers, and
wherein the component comprises an electrical connecting device accessible from an outer delimiting surface or an outer edge of the component, wherein the electrical connecting device is connected to the strain sensing fibers.

2. The fiber composite component according to claim 1, wherein the at least two strain sensing fibers comprise at least two strain sensing fiber strands, each comprising a plurality of strain sensing fibers extending along the same direction.

3. The fiber composite component according to claim 1, further comprising at least one reference layer that is capable of being lithiated, and at least one electrically insulating layer, permeable for Lithium ions and arranged between the at least one reference layer and all strain sensing fibers.

4. The fiber composite component according to claim 1, wherein the at least two strain sensing fibers extend over at least a half of a surface extension of the component.

5. The fiber composite component according to claim 1, wherein the plurality of layers comprises several layers of fibers arranged on top of each other, wherein at least two of the several layers each comprise at least one strain sensing fiber, wherein at least one group of strain sensing fibers is created with all strain sensing fibers of the at least one group extending in the same direction.

6. The fiber composite component according to claim 5, wherein at least two layers each comprise at least one group of strain sensing fibers.

7. The fiber composite component according to claim 1, wherein the plurality of layers comprises several layers of fibers arranged on top of each other, wherein at least two strain sensing fibers are arranged in different layers and extend along the same direction.

8. The fiber composite component according to claim 1,
wherein the plurality of layers comprises several layers of fibers arranged on top of each other,
wherein two groups of strain sensing fibers are arranged in at least one of the layers,
wherein the strain sensing fibers of each group extend along the same direction, and
wherein the strain sensing fibers of a first group and of a second group enclose an angle of at least 45°.

9. The fiber composite component according to claim 1, wherein the electrical connection device comprises two independent electrical connection devices arranged at diametrically opposed ends of the component.

10. The fiber composite component according to claim 1, wherein the strain sensing fibers comprise an electrically insulating coating.

11. The fiber composite component according to claim 1, wherein the component is a carbon fiber reinforced component.

12. A component system with integrated structural health monitoring, comprising:
at least one fiber composite component according to claim 1, and
at least one evaluation unit connected to the electrical connection device of the at least fiber composite component,
wherein the evaluation unit is configured to receive measurement parameters from a plurality of strain sensing fibers and to compare the parameters of at least two of the strain sensing fibers arranged in the at least one fiber composite component, extending in the same direction and provided in different layers and to generate a warning signal if a difference of the parameters is outside a predetermined tolerance.

13. The component system according to claim 12, further comprising a power source selectively connectable to the electrical connection device and an at least one reference layer that is capable of being lithiated for selectively transferring Lithium ions from the at least one reference layer to the strain sensing fibers.

14. An aircraft, comprising at least one component system according to claim 12.

* * * * *